United States Patent [19]

Brandwein

[11] 4,212,694
[45] Jul. 15, 1980

[54] TAPE SPLICING DEVICE AND DISPENSER THEREFOR

[76] Inventor: Arthur Brandwein, 147-37 77 Ave., Flushing, N.Y. 11367

[21] Appl. No.: 932,861

[22] Filed: Aug. 11, 1978

[51] Int. Cl.² ........................................... B65H 81/00
[52] U.S. Cl. .................................. 156/184; 156/268; 156/271; 428/41
[58] Field of Search ............... 156/248, 249, 268, 271, 156/184; 428/40–42; 283/18–22; 206/409, 820

[56] References Cited

U.S. PATENT DOCUMENTS

| | | | |
|---|---|---|---|
| 2,679,928 | 6/1954 | Bishop | 156/268 X |
| 2,797,801 | 7/1957 | Bishop | 156/268 X |
| 3,038,597 | 6/1962 | Brady | 428/41 X |
| 3,663,343 | 5/1972 | Buck | 428/41 |

Primary Examiner—David A. Simmons
Attorney, Agent, or Firm—Philip Rodman

[57] ABSTRACT

The tape splicing device includes a plurality of elongated tab members extending from a flexible marginal portion and an adhesive splicing strip adjoining each tab with the marginal portion. The tab members and the marginal portion are wound about themselves in roll form such that the marginal portion is in substantial surface contact with itself, and an underlying tab member is capable of at least some surface contact with an immediate overlaying tab member.

The tape splicing device is made from a laminate of adhesive tape and flexible sheet that is scored, severed, rolled and trimmed to form individual independently removable elongated tab members and adhesive splicing strips.

A dispenser for the tape splicing device includes a frame that holds a roll of the tape splicing device and permits its unwinding along a bearing surface. A resilient clip on the dispenser clamps the unwound portion against the bearing surface to permit detachment of individual tabs and splicing strips.

6 Claims, 21 Drawing Figures

U.S. Patent  Jul. 15, 1980  Sheet 1 of 4  4,212,694
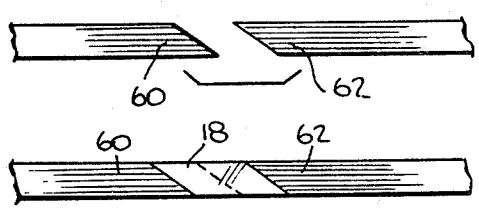
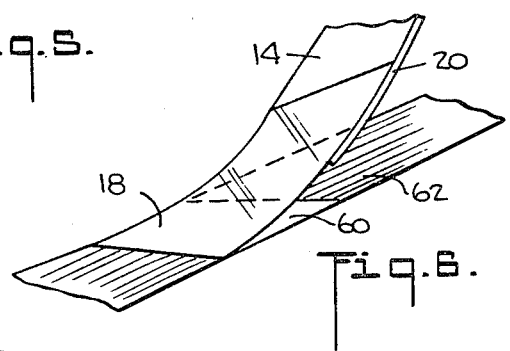
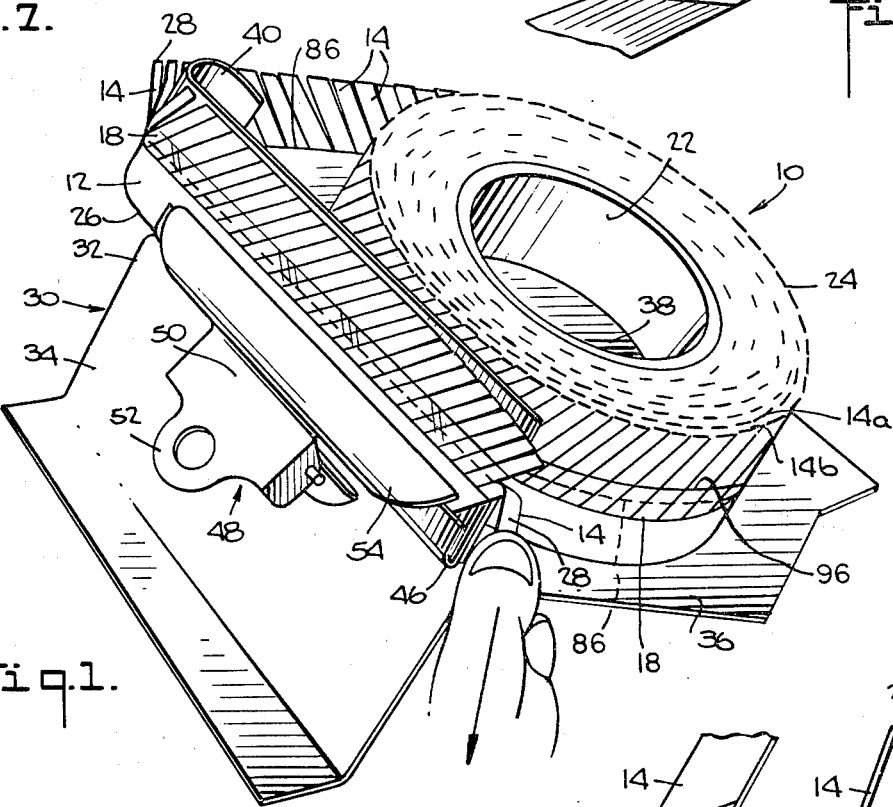
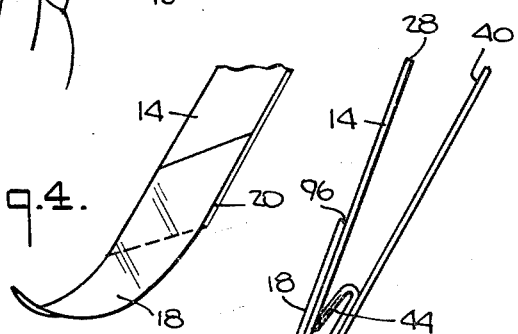
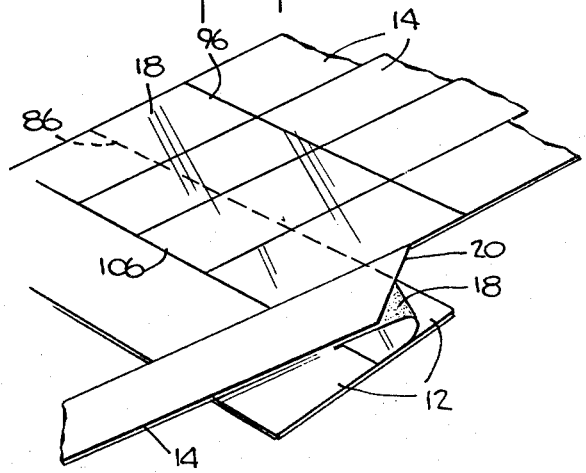
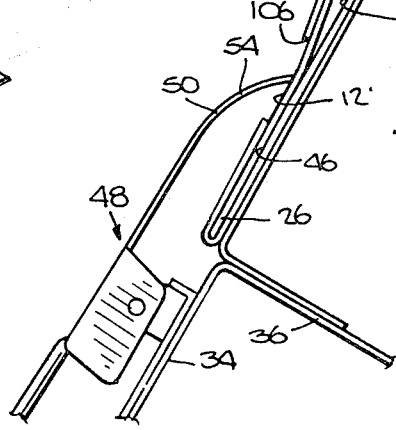

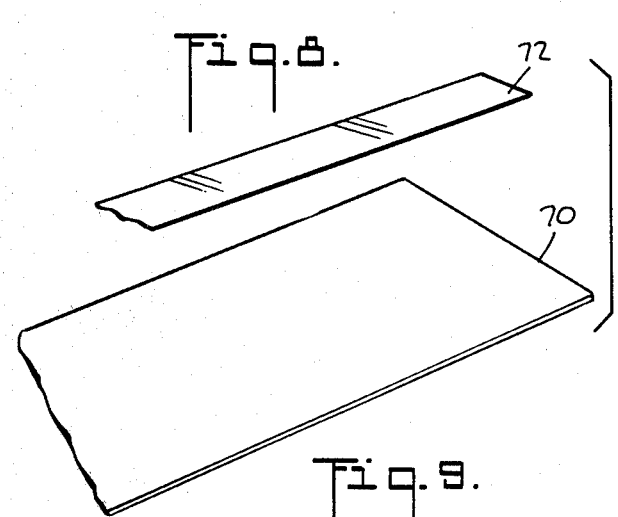
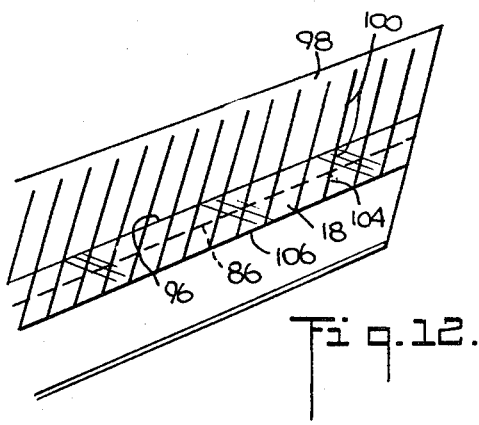
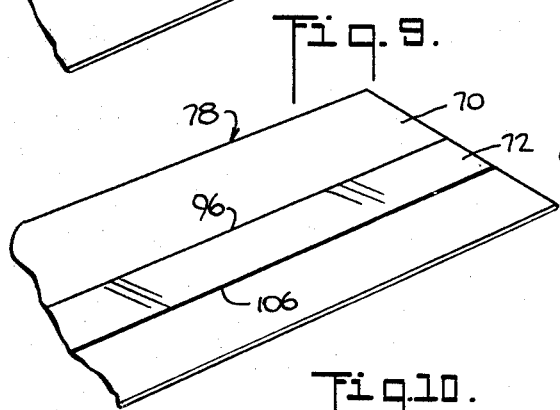
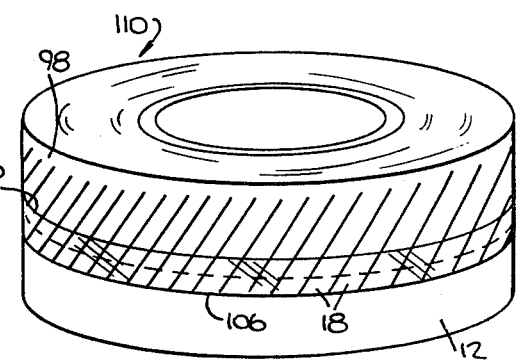
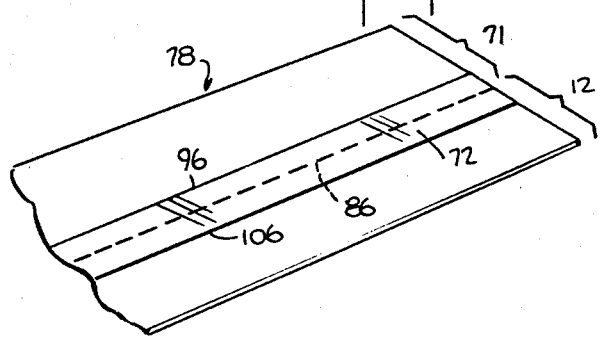
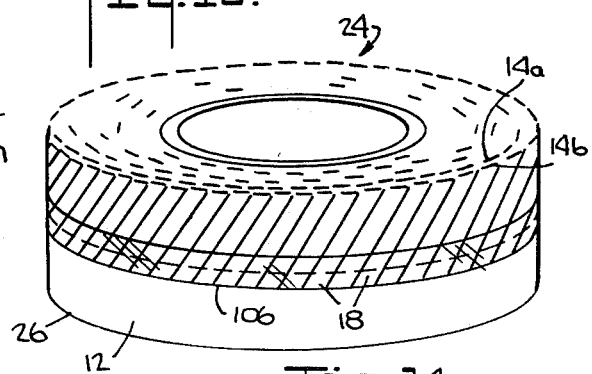
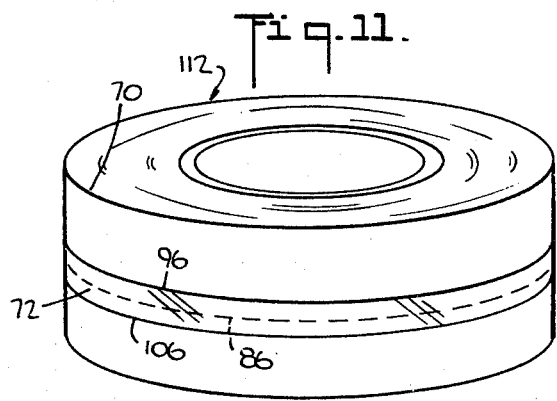
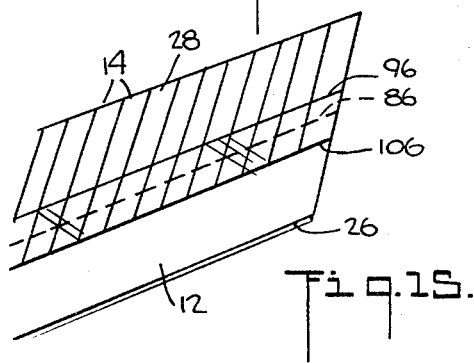

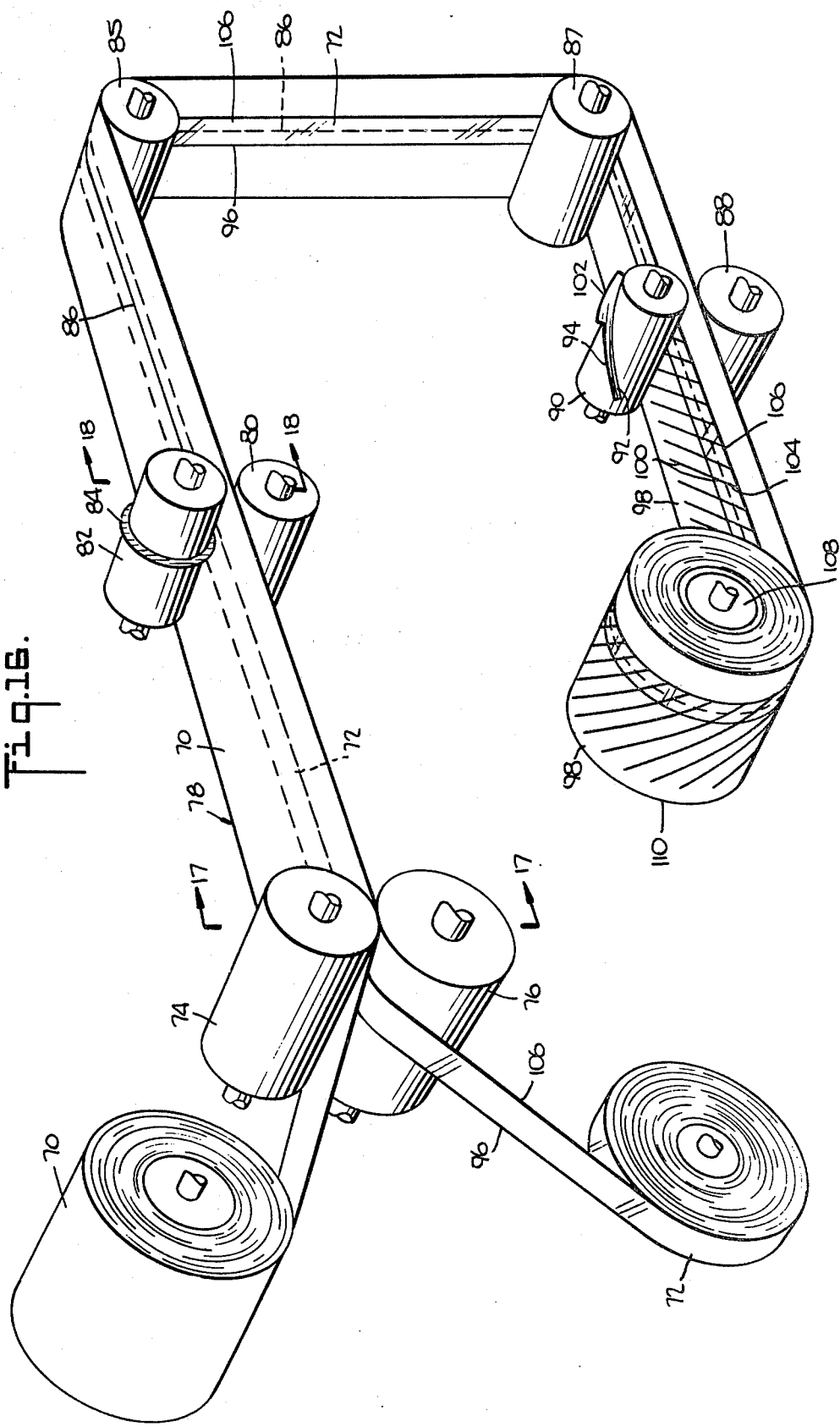

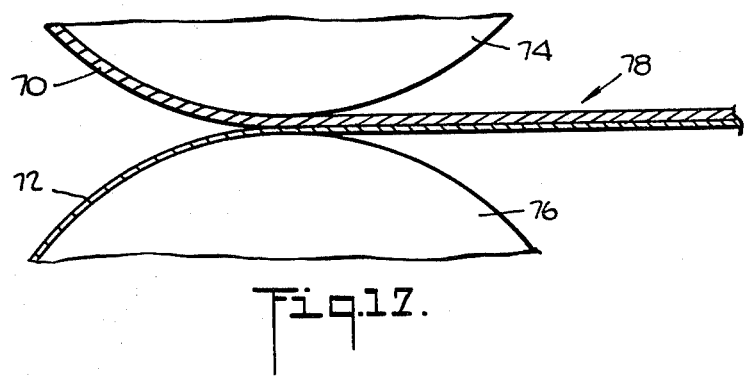
Fig. 17.
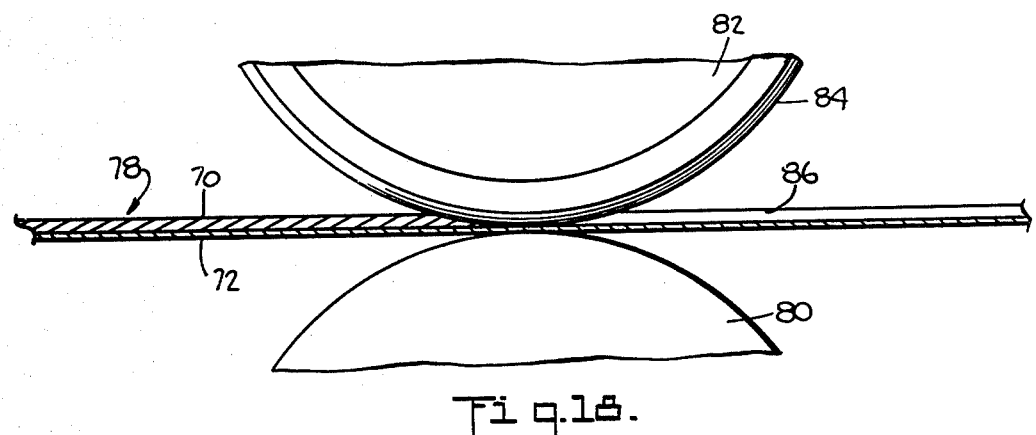
Fig. 18.
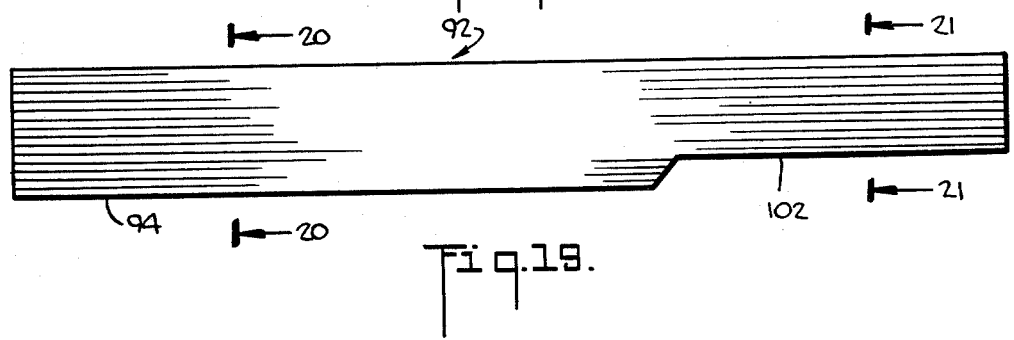
Fig. 19.
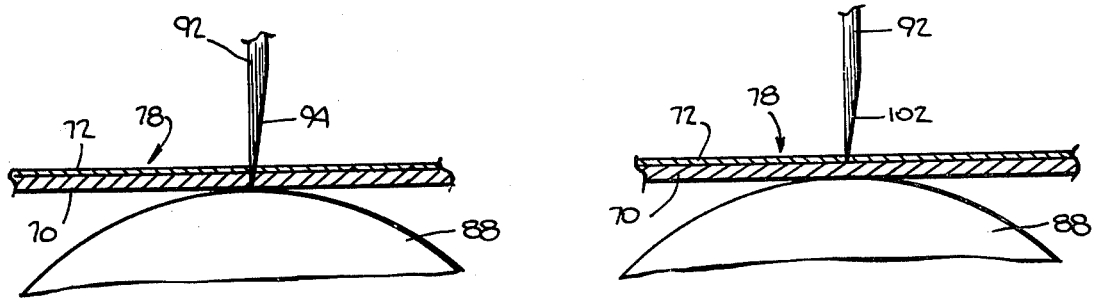
Fig. 20.
Fig. 21.

TAPE SPLICING DEVICE AND DISPENSER THEREFOR

This invention relates to tape splicing devices, dispensers for such devices and methods for making tape splicing devices.

Tape splicing devices, such as the type that includes a metallic-faced adhesive splicing strip, are generally used to join the ends of recording tape together. A known tape slicing structure, as disclosed in U.S. Pat. No. 3,663,343, includes a plurality of elongated tab members wound in roll form around a core. The elongated tab members extend from a band of shorter tabs that are bonded to a support or carrier sheet during manufacture of the tape splicing structure. The junction between each respective pair of elongated and short tabs is bridged by a strip of the splicing tape.

In using the known tape splicing structure, the support or carrier sheet is held within a dispensing device and a free end of the elongated tab is pulled to peel the adhesive strip from the adjacent short tab. The bond between the short tabs and the carrier sheet prevents detachment of the short tabs during the peeling operation. The peeled strip adheres to the removed elongated tab member which facilitates application of the adhesive strip to the items that require splicing. Manipulation of the adhesive strip with the elongated tab member also minimizes the risk of strip contamination due to touch.

Although the carrier sheet supports the elongated and short tab members during their manufacture and also supports the tabs in a dispenser during peeling of the adhesive strip, it adds substantial bulk to the roll of tabs and is normally discarded once the adhesive splicing strips and elongated tab members have been removed from the roll.

It is thus desirable to provide a roll of adhesive splicing strips that does not require a carrier or support sheet for the manufacture or dispensation of said strips.

Among the several objects of the present invention may be noted the provision of a novel tape splicing device, a novel tape splicing device in roll construction wherein a plurality of elongated tab members wound thereon are substantially layered one upon another without the intervention of a separate backup sheet, support sheet, or carrier sheet such that an underlying tab is capable of surface contact with an immediate overlying tab, a novel dispenser for the tape splicing device and a novel method for making the tape splicing device. Other objects and features will be in part apparent and in part pointed out hereinafter.

The present invention relates to a novel tape splicing device, a novel dispenser therefor and a novel method of making the tape splicing device.

In one embodiment the tape splicing device comprises an elongated flexible marginal portion and a plurality of individual tab members, in side-by-side relationship with respect to each other, extending away from the marginal portion. One end of each tab member is adjoined to the marginal portion with a strip of adhesive splicing tape that has a metallic layer such as aluminum. The marginal portion and the tab members are wound around a core such that the marginal portion is in substantial surface to surface contact with itself and the tab members are layered over each other such that an underlying tab member is capable of at least some surface contact with an immediate overlaying tab member.

The tape splicing device is preferably made by laminating an elongated adhesive band, formed with a layer of aluminum for example, to one surface of a sheet of flexible material coated with a release agent. The other surface of the sheet is die cut for example, to provide an elongated score line that coincides with the adhesive band and severs the sheet thickness only leaving the band intact. The score line divides the sheet into a major portion and a marginal portion.

The front surface of the sheet is then provided with a plurality of spaced and parallel cuts at a predetermined angle with respect to the score line. Preferably a bi-level die is used to make the angular cuts. One of the bi-level die cuts is in the adhesive strip extending from the scoreline to a first edge of the adhesive strip. The same die cut also severs the major portion of the sheet from the score line to a border portion of the sheet. The other bi-level die cut severs the adhesive strip in an opposite direction from the score line to a second edge of the adhesive strip but does not sever the sheet. The sheet and adhesive strip laminate are then wound around a core to form a roll. The roll is trimmed at the border portion of the sheet to provide individually independently removable elongated tab members.

One embodiment of a dispenser for the tape splicing device which allows removal of individual elongated tab members and splicing strips includes a frame having means to hold the roll and permit its unwinding. The frame is provided with guide means for establishing a predetermined path of movement of the unwound portion, including a bearing surface over which the unwound marginal portion of the roll is passed. The frame further includes resilient clamping means that hold the marginal portion against the bearing surface to facilitate removal of individual tab members and adhesive strips from the unwound portion. The resilient clamping means can be moved away from the bearing surface to permit the positioning of successive lengths of the marginal portion against the bearing surface of the dispenser frame.

The invention accordingly comprises the constructions and methods hereinafter described, the scope of the invention being indicated in the following claims.

In the accompanying drawings in which various embodiments of the invention are illustrated:

FIG. 1 is a perspective view of a tape splicing device and dispenser therefor incorporating one embodiment of the present invention;

FIG. 2 is an enlarged fragmentary profile view of the dispenser;

FIG. 3 is an enlarged fragmentary detail of an adhesive splicing strip and an elongated tab member being peeled from a marginal portion of the tape splicing device;

FIG. 4 is an enlarged fragmentary detail of the peeled strip and tab;

FIGS. 5-7 show the ends of a tape being spliced together;

FIGS. 8-14 show the various stages of manufacture of the tape splicing device;

FIG. 15 is a plan view thereof;

FIG. 16 is a simplified schematic diagram of apparatus for manufacturing the tape splicing device;

FIGS. 17 and 18 are sectional views taken on the lines 17—17 and 18—18 of FIG. 16;

FIG. 19 is a simplified plan view of a typical cutter from a bi-level cutting die; and FIGS. 20 and 21 are sectional views taken on the lines 20—20 and 21—21 of FIG. 19.

Corresponding reference numbers indicate corresponding parts throughout the several views of the drawings.

Referring now to the drawings a tape splicing device incorporating one embodiment of my invention is generally indicated by the reference number 10 in FIG. 1.

The tape splicing device 10 comprises an elongated flexible marginal portion 12 and a plurality of individual independently movable tab members 14 extending in side by side relationship from the marginal portion 12. The marginal portion 12 and the tab members 14 are formed of a suitable sheet material 70 such as paper coated with a release agent. For example paper identified by the designation 78KC50, having a full surface release coating identified by the designation FR133 and sold by Fitchburg CPI, Scranton, Pennsylvania, have provided satisfactory results.

The tape splicing device 10 also includes an adhesive strip 18 adjoining an end portion 20 of the tab member 14 to the marginal portion 12. The adhesive strip 18 is preferably derived from an aluminum sensing tape or cueing tape 72 such as sold by Armak of Marysville, Mich. under the designation LA-2 and includes a laminate of aluminum and Mylar material with a pressure sensitive adhesive coating.

The marginal portion 12, the tab members 14, and the adhesive strips 18 are wound around a core 22 to form a roll 24. Under this arrangement the marginal portion 12 is in substantial surface to surface contact with itself, and the tab members 14 overlay one another such that an underlying tab member 14a for example, is capable of at least some surface contact with an immediate overlaying tab member 14b.

A dispenser for the tape splicing device 10 is generally indicated by the reference number 30 in FIG. 1. The dispenser 30 comprises a frame 32 having front and rear inclined intersecting leg portions 34 and 36 respectively. A generally circular hub portion 38 is formed on the rear leg 36 for engagement with the core 22 of the tape splicing device 10.

Guide means for establishing a predetermined path of movement for the tape splicing device 10 as it unwinds, include a guide plate 40 welded or otherwise secured to the frame 32. The guide plate 40 includes a bearing surface portion 42 (FIG. 2) and spaced upper and lower U-shaped slotted portions 44 and 46.

The frame 32 also includes resilient clamping means comprising a spring clip 48 attached to the front leg 34 in any suitable known manner. The spring clip 48 has a conventionally pivoted hold down member 50 with a lever arm 52 and a contact portion 54 arranged to make linear contact with the bearing surface 42 under the influence of a known biasing spring (not shown).

In using the tape splicing device 10 the roll 24 is placed on the dispenser 30 with the core 22 engaging the hub 38. A portion of the roll 24 is unwound and passed over the guide plate 40 with an edge 26 of the marginal portion 12 engaged in the slotted portion 46. The lever arm 52 is depressed to permit positioning of the marginal portion 12 between the bearing surface 42 and the contact portion 54 of the spring clip.

Release of the lever portion 52 permits the contact portion 54 to press and hold the marginal portion 12 against the bearing surface 42. The dimensions of the marginal portion 12, the guide plate 40 and the spring clip 48 are predetermined to ensure that the contact portion 54 of the spring clip 48 engages the marginal portion 12 and not the tab members 14 or the adhesive strips 18 when the edge portion 26 is engaged in the guide plate slot 46. The slot 44 serves to space the tab members 14 from the guide plate 40.

A free end 28 of the tab members 14 is pulled in a generally downward direction as shown in FIG. 1 to peel the strip 18 from the marginal portion 12. In this manner the adhesive strip 18 remains secured to the end portion 20 of the tab 14 while it is being peeled from the marginal portion 12.

The peeled strip 18 is manipulated by the tab member 14 to the items being spliced such as tape ends 60 and 62. The tape ends 60 and 62 are positioned in abutting relationship and the peeled portion of the adhesive strip 18 is pressed against the abutting tape ends to join them together. The tab member 14 is then twisted or pulled away from the pressure secured portion of the adhesive strip 18 to expose the remaining adhesive strip portion which is thereupon pressed down onto the tape ends 60 and 62 to complete the splice.

In making the tape splicing device 10, the sheet material 70 and the aluminum sensing tape 72, each in roll form (FIG. 16) are unwound and passed through pressure rollers 74 and 76 to form a laminate 78. The laminate 78 is next passed between a roller 80 and a die 82 having a circular cutter 84 that cuts through the sheet 70 to form a score line 86 coincident with the tape 72. The score line 86 divides the sheet 70 in a major portion 71 and the marginal portion 12 (FIG. 10). The depth of cut of the cutter 84 is set in a known manner to sever the sheet 70 only, without cutting through the tape 72.

The scored laminate 78 is then passed around idlers 85 and 87, and intermediate a roller 88 and a die 90. The die 90 includes a plurality of bilevel cutting blades 92 of generally helical curvature, with only one of the cutting blades 92 being shown for the sake of simplicity. The bilevel cutting blade 92 is formed with a first cutter portion 94 which severs the tape 72 from the score line 86 to a first tape edge 96, and also severs the underlying sheet 70 from the score line 86 to a border portion 98 as indicated at a severance 100 (FIG. 12). The cutting blade 92 also includes a second cutter portion 102 which simultaneously severs only the adhesive tape 42 as indicated at a severance 104 (FIG. 12). The severance 104 is opposite and substantially continuous with the severance 100 and extends from the scoreline 86 to a second tape edge 106. The additional bilevel cutter blades 92, which are not shown, are formed on the periphery of the die 90 in a predetermined fashion to provide parallel cuts identical to the severances 100 and 104 with predetermined spacing therebetween.

The laminate 78 passes from the bilevel die cutter 90 to a winding station 108 where it is wound to form a compact roll 110. The roll 110 is trimmed to remove the border portion 98 thereby yielding the roll 24 with a major portion comprised of individual independently movable and removable tab members 14.

I have found that a more desirable bond is formed between this sheet material 70 and the sensing tape 72 if the scored laminate is permitted to sit for approximately ten days at room temperature before the bilevel die cutting operation. Thus the laminate is wound into a roll 112 (FIG. 11) after passing the die 82 wherein the scoreline 86 is formed. The formation of the roll 112 can be accomplished in any suitable manner such as substituting a windup spool (not shown) for the idler 85. The roll 112, after its approximate ten day cure period, is unwound for passage to the bilevel dutting die 90 in a manner similar to that previously described.

As will be apparent to those skilled in the art the severances 100 and 104 can be formed at any selected angle with respect to the scoreline 86 preferably at an angle of approximately 45 degrees. It will also be apparent that the adhesive splicing strip 18 need not necessarily be structured of a metallic laminate but can be formed of any selected material concomitant with a desired splicing operation.

Some advantages of the novel invention evident from the foregoing description include a tape splicing device that does not require a separate backup sheet, carrier sheet or support sheet for its manufacture or for the dispensation of individual adhesive splicing strips. Consequently the tape splicing device disclosed herein contains more tape splicing strips per unit volume of roll than has heretofore been available and is more economical to manufacture because no backup sheet, carrier sheet or support sheet is required. A further advantage is the simultaneous formation with a bilevel cutting die of die cuts having different depths. Another advantage is a dispenser that securely grips the tape splicing device during dispensation of the adhesive splicing strips.

In view of the above it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method for making a tape splicing device comprising, laminating an adhesive tape to an elongated flexible sheet, the adhesive tape being of lesser width than the sheet, forming an elongated scoreline in the sheet coincident with the adhesive tape to divide the sheet into major and marginal portions with a first portion of the tape lying on the major portion of the sheet, and a second portion of the tape lying on the marginal portion of the sheet, the major and marginal portions of the sheet being of greater width than the respective first and second portions of the tape, forming a first plurality of spaced and parallel severances in the major portion of the sheet and the first portion of tape extending from the scoreline past the first portion of the tape to divide the major portion into elongated tab members that extend from the scoreline between consecutive first severances, and forming a second plurality of spaced and parallel severances respectively continuous with the first spaced and parallel severances, in the second portion of the tape to sever the second portion of tape but not to sever the underlying marginal portion of the sheet so that no slits extend substantially across the marginal portion and the marginal portion remains continuous and in one piece after the second plurality of severances are made and need not be supported by or secured to any carrier sheet, the first and second severances being made to divide the adhesive tape into individual adhesive splicing strips that are adhered to the marginal portion and to the respective elongated tab members, and providing the major and marginal portions of said sheet with adhesive release means to permit release of the adhesive splicing strips from the major and marginal portions.

2. The method of claim 1 wherein respective first and second severances are made simultaneously.

3. The method of claim 1 wherein said first plurality of severances are terminated at a border portion near a free edge of the major portion of said sheet.

4. The method of claim 3 wherein the severed and scored laminate is wound into a compact roll such that the major and marginal protions of the sheet are in substantial surface to surface contact.

5. The method of claim 4 wherein the border portion of the wound roll is trimmed away.

6. The method of claim 1 wherein the laminate is allowed to cure for appoximately 10 days at room temperature after the score line is formed and prior to the formation of the first and second plurality of severances.

* * * * *